Feb. 16, 1971  E. A. GRANFORS ET AL  3,564,491
DIRECTIONAL SONAR TRANSDUCER
Original Filed Sept. 8, 1967   5 Sheets-Sheet 1
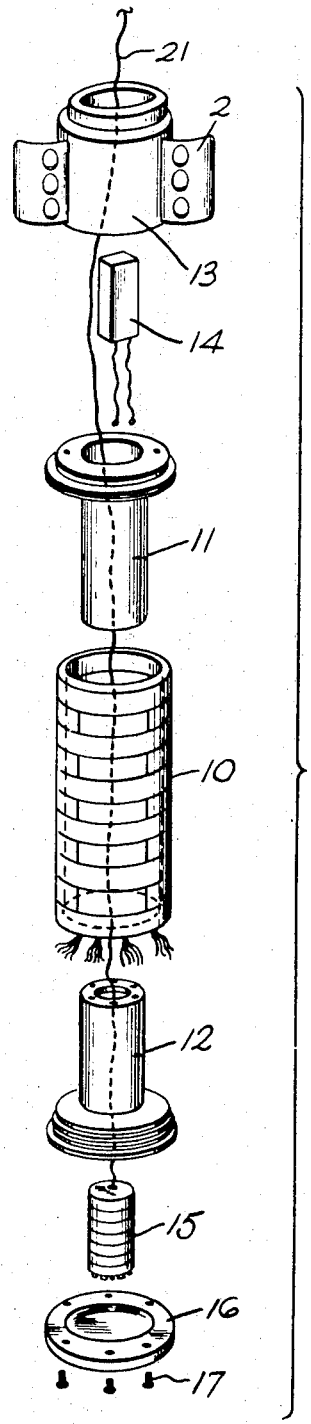
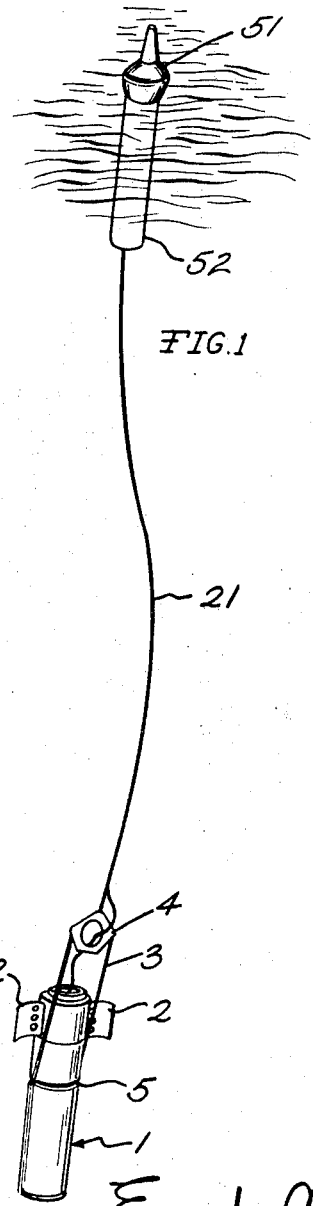
Ernest A. Granfors
Don L. Lovelers
Charles D. Boyle
Harry N. Kompanek
INVENTORS
By Beaman & Beaman
ATTORNEYS

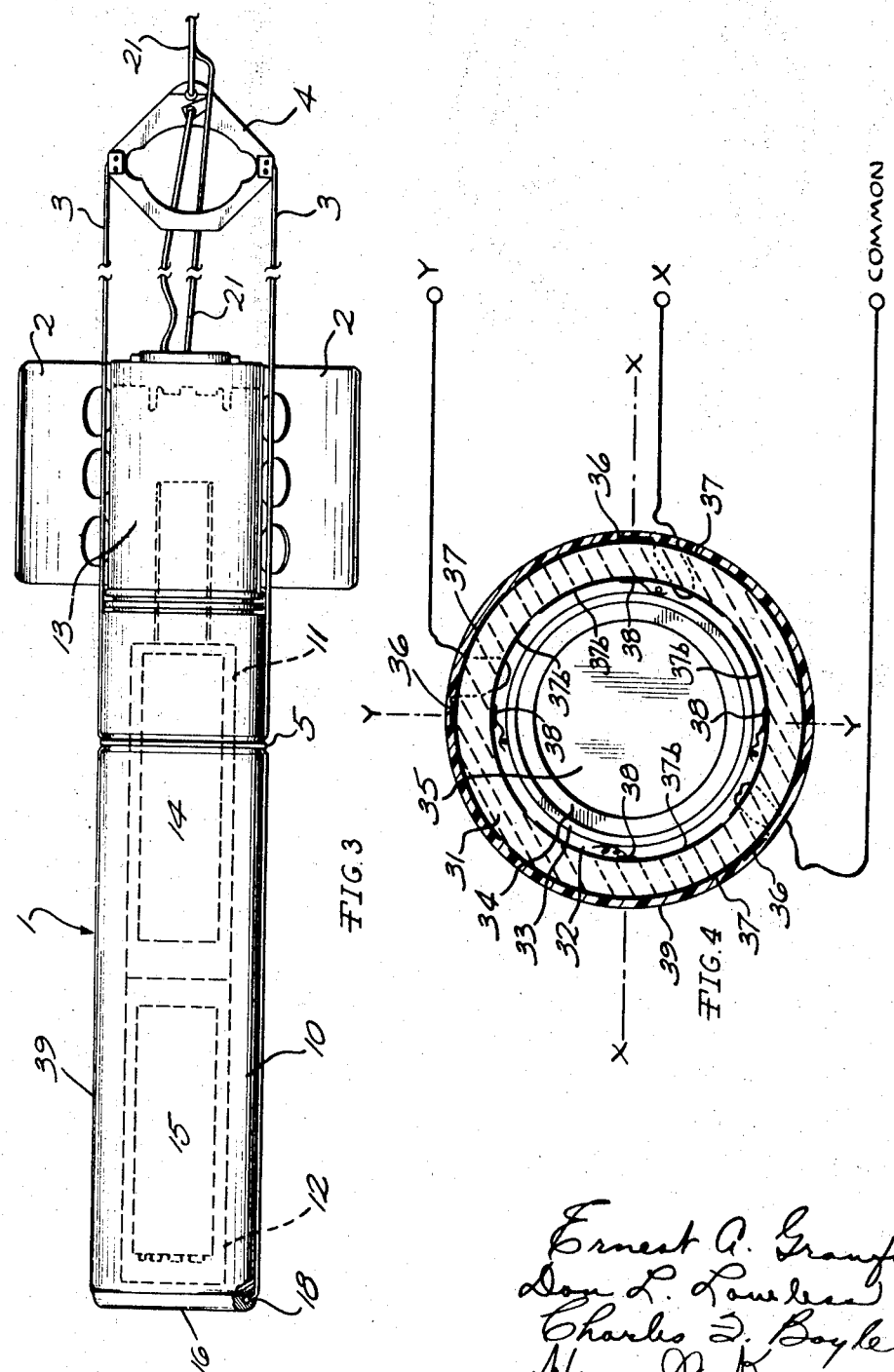

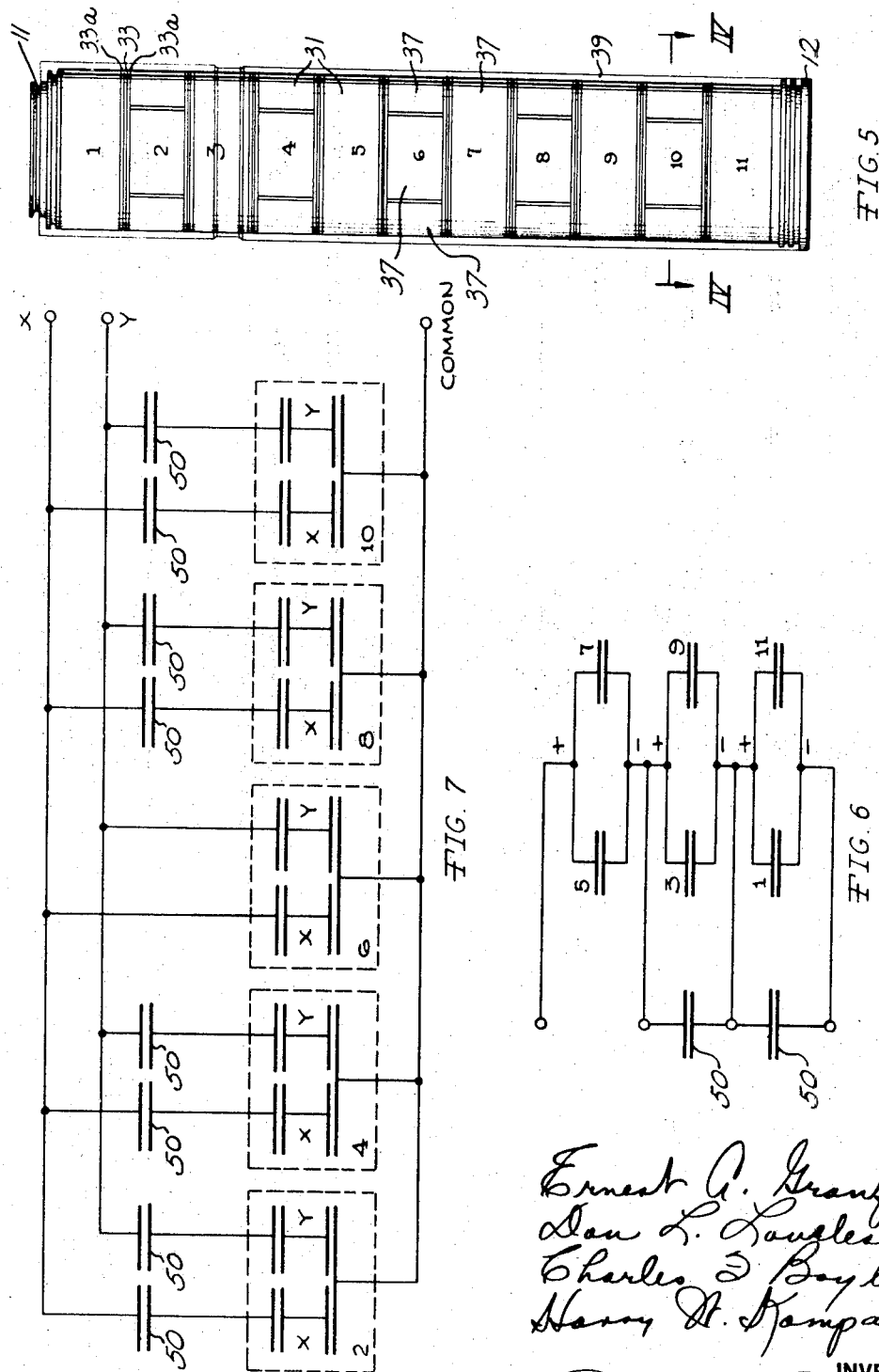

United States Patent Office 3,564,491
Patented Feb. 16, 1971

3,564,491
DIRECTIONAL SONAR TRANSDUCER
Ernest A. Granfors, Don L. Loveless, and Charles F. Boyle, Jackson, Mich., and Harry W. Kompanek, Santa Barbara, Calif., assignors to Sparton Corporation, Jackson, Mich.
Original application Sept. 8, 1967, Ser. No. 666,405, now Patent No. 3,444,508, dated May 13, 1969. Divided and this application Mar. 26, 1969, Ser. No. 810,616
Int. Cl. H04r 1/40
U.S. Cl. 340—10                                  3 Claims

ABSTRACT OF THE DISCLOSURE

A transducer for underwater acoustic sensing systems wherein the transducer comprises hollow piezoelectric ceramic cylinders acoustically isolated and stacked in a vertical interstitial array. Three transducer sections are utilized having an output level and relative polarity related in accordance with the direction from which the acoustic signal being received arrives. One of the acoustic receiving patterns is omnidirectional, and the others are sinecosine dipole patterns which have the characteristic of output level variation with bearing. The omni output provides an amplitude and phase reference for comparing the amplitude and polarities of the two bearing-sensitive signals. The resultant three signals, and compass information constitute the primary outputs of the sensing system which are transmitted to suitable decoding and radio transmission apparatus.

CROSS-REFERENCE TO RELATED APPLICATION

This application is a division of U.S. application Ser. No. 666,405, filed Sept. 8, 1967, now Pat. 3,444,508 issued May 13, 1969.

BACKGROUND OF THE INVENTION

In the detection of underwater bodies a number of methods have been employed, and depending upon the specific needs, the most successful methods have relied upon one or more of the following: Magnetic (self-generated and perturbation of the earth's magnetic field), optical, electric field, thermal (infra-red), hydrodynamical, and acoustic (radiated self noise and reflected energy). Of these various methods the latter is the best subject of the instant invention. As utilized herein, sonar refers broadly to the employment of propagated acoustic energy through a water medium, for the purpose of observation, detection and/or communication.

As in other detection systems, one of the principal items of concern is to provide for an effective method of separating information indicating the presence of the sought object from the background or clutter caused by similar pieces of information completely unrelated to the detected object. Specifically, a passive sonar system attempts to do this using acoustic signals which are radiated by the submerged body, and in the instant case, broadly defined as an active system, the acoustic energy (signals) are reflected from the target. The acoustic energy is derived principally from the sonar system transducer. In general, there are other sources of acoustic energy in the ocean which tend to mask the desired signals. A great deal depends upon a quantity known as signal-to-noise ratio $(S/N)$[1]. In this ratio, $(S)$ is the average signal power in watts measured over the time it exists and $(N)$ is called the average noise power in watts in the band of the sonar referring to the average power in the interfering background wave form. The signal and noise powers are the unit area values in the water just outside the transducer. Generally, it is assumed that a signal may be detected on the average 50 percent of the time in the presence of noise if the signal-to-noise ratio exceeds a predetermined number which is commonly referred to as the recognition differential. The applicants have found that by providing additional selectivity in the form of directional horizontal and/or vertical receiving responses, they achieve a significant enhancement of the signal-to-noise ratio as compared to even the most sophisticated and technically advanced equipment theretofore known.

While the instant invention may be utilized very effectively in a passive sonar system, it is intended to relate more specifically in an illustrative sense as an active sonar system wherein acoustic energy is transmitted by the sonar system and the signal is received by the system in the form of an echo from the submerged body.

The invention relates to underwater sensing systems, and more particularly to sonar transducer systems for detecting submerged bodies, and includes a subsurface assembly consisting of a sonar transmitter, sonar receiver, and a transducer which is mechanically and electrically connected to the surface unit by a mechanically supporting electrically conducting cable. The surface unit which supports the subsurface sensing unit when it is deployed in the sea water, contains a receiver, decoder, transmitter, an antenna system, and associated electronic equipment.

The command activated sonar system of the invention may be used as a replacement for existing air-launched sonar systems which are activated upon water entry. This system can be operated and controlled as to pulse type, rate, operating time and as to other operational characteristics of the system, and thereby provides for a significant improvement in the flexibility of active sonar systems.

Previous attempts to provide for an effective submerged body detection system involve utilization of magnetostrictive transducers as disclosed by Peek, U.S. Pat. No. 2,468,-837. More recent attempts to provide for detection systems take advantage of piezoelectric transducers of the type wherein the mechanical and electrical elements form periodic delay lines as described by Trott, U.S. Pat. No. 3,321,738; and another type employs flexural-extensional electromechanical transducers for omnidirectional applications as disclosed by Toulis, U.S. Pat. No. 3,277,433. A still further sonar system is disclosed by Ehrlich et al., 3,290,646, wherein is described a multimode transducer which produces two simultaneous dipole patterns with substantially mutually perpendicular acoustic axes and an omnidirectional pattern from plane wave signals, these pattern formations being provided by utilization of external phasing and summing electronic circuitry which are essential to the operation thereof.

SUMMARY OF THE INVENTION

The transducer of the invention is disclosed as used with a system which utilizes the advantages of the transducer in the most effective manner. Present day high search rate requirements dictate the providing of higher sensitivity and higher range detection systems, in conjunction with higher resolution transducers as a subsystem with fully automated signal analyzers and display units, as is now made possible by the instant invention.

It is the purpose of the invention to provide for a high resolution underwater detection system transducer which makes possible airborne fixed wing aircraft, helicopter, and shipboard detection and tracking of submerged objects. It has been found that a significant improvement in detection systems can be realized through the herein provided novel transducer assembly taken in conjunction with appropriate signal conditioning and analyzing equipments. Enhanced directional capability, lower operating frequencies, and greater range are also provided by the instant system. Other significant advantages are its inherent simplicity and low unit manufactured cost.

The instant invention provides for integral transducer phasing and summing thereby directly providing for sine-cosine voltage outputs. External circuitry is eliminated.

Precise tracking and localization of submerged bodies is made possible through the system wherein from the ship or aircraft address and sonic tone information are supplied by a signal generator to a function generator which then initiates an amplitude modulated radio frequency transmission from a transmitter. This UHF transmission is then demodulated by a receiver in the floating surface assembly. Thereafter the demodulated sonic pulse is sent to its sonar transmitter and then to the transducer for ensonification of the water. After the sonic transmission is completed, the water units return to a listening mode until the next sonic transmission. Acoustic information received during the listening time is amplified by the sonar band pass receiver and the amplified information then frequency modulates a VHF transmitter which transmits on one of the selected VHF surface assembly frequencies. The VHF transmission is received by the shipboard, avionic, or land base receiver and is demodulated, in the receiver, with the demodulated acoustic signal being sent to a signal generator for translation to a lower frequency. The signal is sent to an analyzer and then presented on a display unit or as desired in the form of hard or soft copy output.

It has accordingly been realized that by utilizing the instant invention, a significant improvement in water detection methods has been made possible. These functional benefits have been realized without increasing system cost. Moreover, since integral phasing and summing of voltages is provided within the transducer array, a significant reduction in electronics has been realized while simultaneously providing for higher resolution.

Accordingly, the principal object of this invention is to provide for an improved underwater sonar system transducer.

Another object of the instant invention is to provide for a directional sonar transducer having integral phasing and summing features.

Another object is to provide a multimode interstitial transducer array which produces output voltages as a function of target gearing.

A still further object of the invention is to make commercially available a practical broad frequency sonar transducer system having extreme sensitivity at 6 kc. to 12 kc., and being particularly useful over the frequency range of 5 cycles to 12 kc.

An additional object is to provide for the practical realization of a data command controlled underwater search system having highly sensitive directional capabilities.

Another principal object of the invention is to provide for a high capacitance radially polarized cylindrical transducer having high directional sensitivity.

A particularly important object of the invention is to make possible a vertically stabilized underwater cylindrical probe with high tracking functionality.

A further principal object of the invention is to make commercially practical the fully automated generation, transmission, analysis and display of high signal-to-noise ratio directional sonar search information.

These and other objects of the instant invention can be more readily understood, and the uniqueness of the underwater detection system and more particularly the transducer subsystem, as well as its manner of construction and use, will be more readily appreciated from the following detailed description, taken in conjunction with the accompanying drawings, forming a part hereof, in which:

BRIEF DESCRIPTION OF THE DRAWINGS

FIG. 1 is a representation of a deployed surface assembly and subsurface probe assembly, FIG. 2 is an exploded perspective of the subsurface probe assembly, FIG. 3 is a side perspective of the subsurface assembly illustrating the fin stabilizer and towing bridle, FIG. 4 represents a top cross-sectional view of the transducer assembly taken along lines IV—IV of FIG. 5, FIG. 5 is a side elevation view of the interstitial transducer array enclosed in an acoustically transparent neoprene boot, FIG. 6 depicts the omnidirectional array circuit equivalent, FIG. 7 represents the circuit equivalent of the directional line array.

DESCRIPTION OF THE PREFERRED EMBODIMENT

Figure 10:
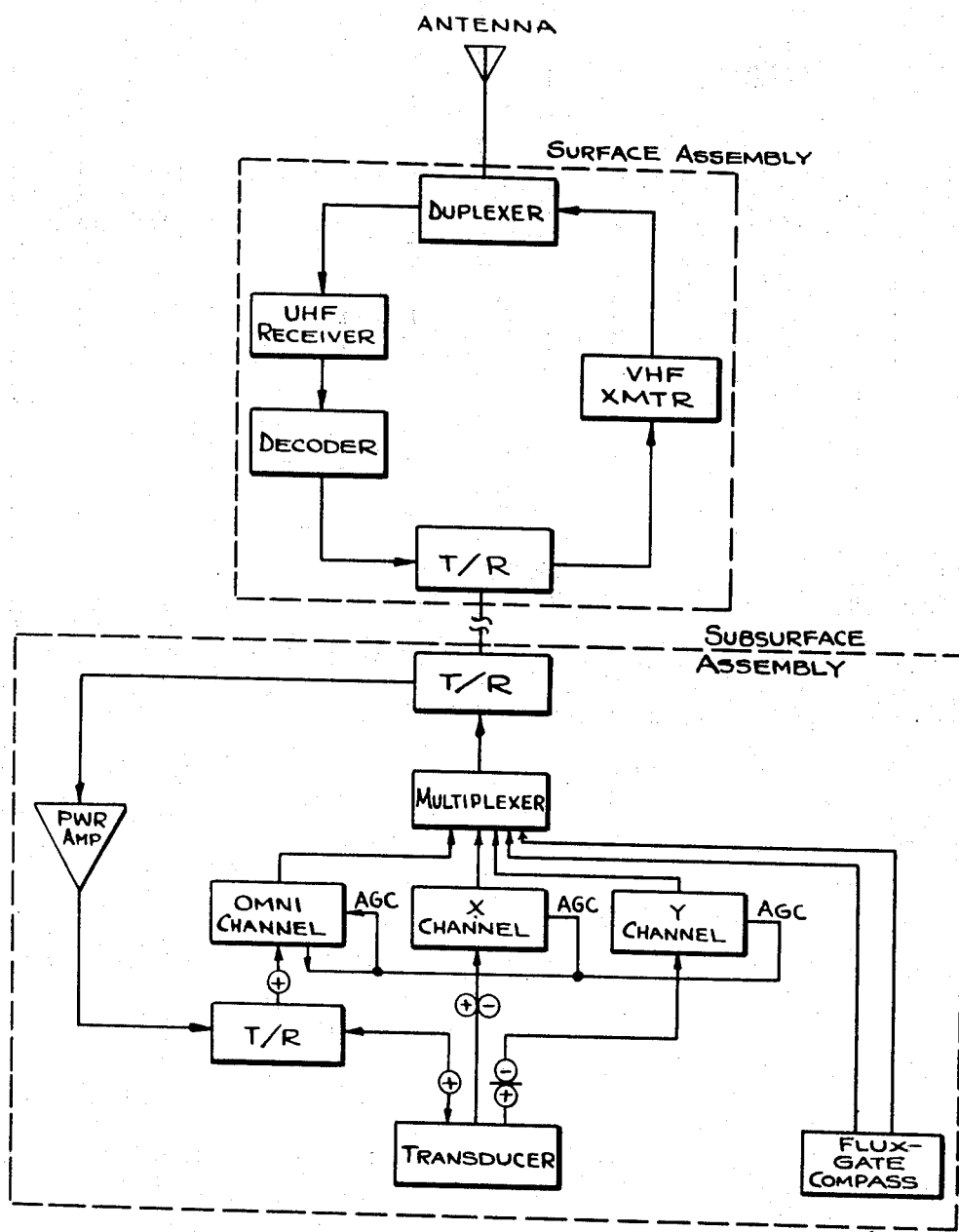
FIG. 10 shows the signal flow paths and operations of the system.

Suspended by cable 21 in the deployed subsurface probe assembly 1 as illustrated in FIG. 1. Positioned on top of floating buoy assembly 52 is a floatation bag 51 which houses the VHF antenna structure, and located within the floating assembly 52 is the electronic circuitry and other functional electronic elements as illustrated in FIG. 10. Also shown in FIG. 1 are the stabilizing fins 2 which assume when stowed a nested position in a narrow annular space surrounding the body portion, but when deployed assume the open illustrated position. The towing bridle cable 3 and bridle spreader 4, taken in conjunction with bridle attachment band 5 located at the center of the horizontal fluid dynamic drag of the subsurface probe, make possible stabilization about the vertical axis of the probe 1 despite the action of currents and impressed fluid flow thereupon. More particularly, the fin and bridle system act by means of a dihedral effect to constrain the probe assembly to align itself in a single vertical attitude referenced to the direction of an impressed fluid flow.

It is thus seen that the bridle and fin structure cooperate to stabilize the cylindrical probe to maintain a vertical attitude thereto while it is under the influence of steady state transverse fluid flow conditions of any speed, with the fins and bridle assembly further acting to increase the righting moment of the body, thus causing it to maintain a vertical attitude under other conditions which might produce disturbing forces, such as under conditions of vertical heaving motion. By minimizing yaw and roll of the probe, accurate transducer response patterns and transducer resolution are made possible.

In FIG. 2 is an exploded perspective of the subsurface probe assembly illustrating the major ports thereof, with the transducer interstitial array 10 supported between aluminum flanged cylinders 11 and 12 and mounted below the cable pack housing 13. Contained in the upper aluminum cylinder is a battery 14, and within the lower aluminum supporting cylinder 12 is contained a multisectioned electronic section 15 suitably enclosed and sealed therein by bottom plate 16 and screws 17.

As illustrated in FIG. 3, the electronic section 15 and battery compartment 14 are located within the area defined by a transducer aluminum cylinder 11 and 12 supporting members. Also shown in FIG. 3 is the lower bridle cable 3 attachment to probe 1 located at point 18 within the lower plate 16. Located generally at 15 are the power amplifier, compass circuitry, compass sensor, sonar transmitter, transmitter-receiver relay and multiplexer, heat sink, multichannel amplifier, as well as the sonar receivers. Immediately to the exterior of aluminum separating and supporting cylinders 11 and 12 is the ceramic transducer array 10, as shown in FIG. 4.

As illustrated by FIG. 4, a cross section taken along IV—IV of FIG. 5, the piezoelectric ceramic 31 (lead zirconate-lead titanate) is provided with an annular air space 32 between Delrin spacer 33 which also provides a structural rigidity and support thereto, with the aluminum can 12 being suitably end sealed by metal cap 35. While PZT ceramics as manufactured by Clevite Corporation, Bedford, Ohio, have been found particularly useful, other piezoelectric materials can be desirably employed such as ADP, lithium sulphate, and other polycrystalline materials.

Figure 8:
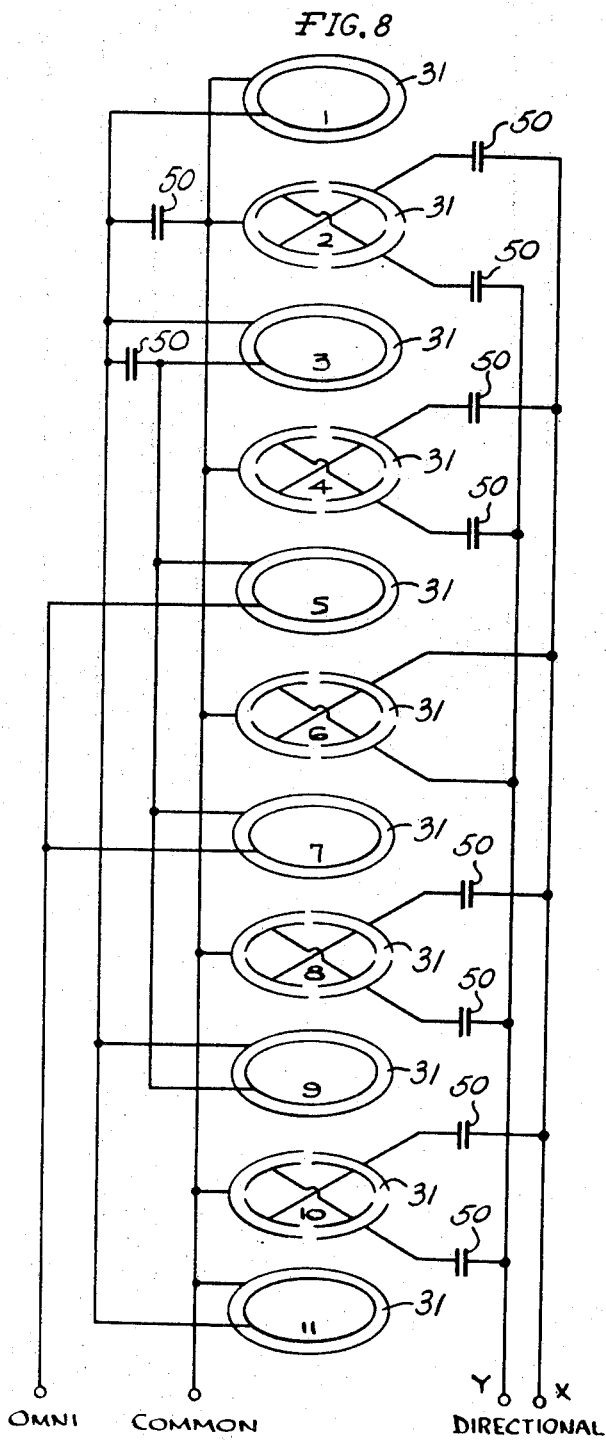
FIG. 8 is a wiring diagram of the transducer interstitial array.

Making electrical connection to the silver film 37 along the exterior of ceramic cylinder elements 31 are contacts 36 with electrical contacts 38 being provided for contact to inner silver electrode areas 37b. The electrode configuration of FIG. 4 is as employed in the directional transducer cylindrical elements. The electrical connections are made between opposing quadrants of the interior positioned electrodes 38. External connections are made as illustrated to the X, Y, and common, as illustrated in FIG. 8. Providing for a completely sealed enclosure is the neoprene boot 39. Full cylinders with full Ag electrode areas (inner and outer surfaces) function as the omnidirectional elements.

The individual ceramic cylindrical elements 31 are identified with numbers from 1 to 11 as illustrated in FIG. 5. These corresponding individual functional electrical elements are identified in FIG. 6 and FIG. 7. As illustrated, they can be represented as capacitive elements. In FIG. 6 and FIG. 7 shading capacitors 50 are employed. These capacitors are typically metalized Mylar. Also shown in FIG. 5 are the silver plated outer electrode 37 areas, neoprene protective coating 39, with aluminum cylinder and flange supports 11 and 12. The Delrin spacer and support 33 has disposed contiguous therewith synthetic cork shims 33a to provide the cushioning and sealing thereat. Use of acoustic isolator shims 33a between the spacer 33 and the cylindrical ceramic elements 31 are necessary for proper transducer functioning. While Corprene, a mixture of cork and Neoprene, has been found useful, other acoustic isolating materials can be employed. Elements 31 are selectively spaced to provide minimal pertabations occurring in the major beam pattern and to also promote maximum reduction of minor lobes.

A wiring diagram is shown in FIG. 8 for the transducer element and illustrates the electrical phase relationship between the omni elements 31 (odd numbered units) and the electrical phase relationship between the directional elements 31 (even numbered units). The simplicity of the circuitry lends itself for low cost manufacture and also provides for inherent functional accuracy and reliability. No external phasing or complicated summing circuitry are required to achieve the directional characteristics. Shading capacitors 50 providing for a reduction of undesired minor lobes are typically of the metalized Mylar type.

Figure 9A:
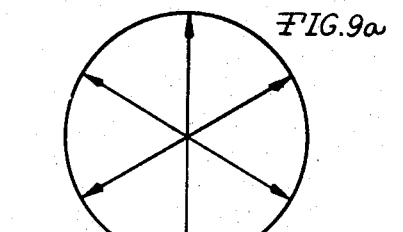
FIGS. 9a, 9b, 9c and 9d illustrate an excited segmented transducer cylinder section.
Figure 9B:
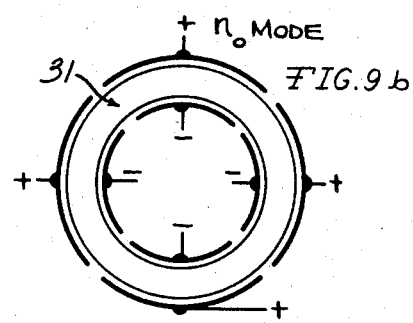

The directional properties of the interstitial cylindrical transducer assembly 10 result from the fundamental that any right circular cylinder has several mechanical modes of resonance. In the case of the segmented cylinder, the output is the sum of two voltages, both of which are the result of vibrations in two principal modes as noted herein (FIGS. 9a, 9b, 9c and 9d) When a pressure wave passes the cylindrical element 31, radial expansions and contractions occur. If all the stresses and voltages developed are in phase, the transducer is vibrating in the $n_0$ mode as in FIG. 9b. The transducer has many resonant modes having the following frequency relationship:

$$f_r = \frac{C}{\pi D} \sqrt{1+n^2}$$

where:

$f_r$ = resonant frequency
$D$ = diameter of cylinder
$C$ = sound velocity within the material
$n$ = mode of vibration Unless otherwise suppressed, the cylinder when mechanically driven will resonate in several modes simultaneously. When placed in a sound field the nodes of vibration of the cylinder will be aligned tangentially to the equal-pressure plane of the sound wave, or in other words, perpendicular to the sound source. Thus, for $n=0$, the cylinder will vibrate in a radial mode (FIG. 9b) yielding an omnidirectional horizontal directivity pattern. For $n=1$, the cylinder will vibrate in a dipole mode (FIG 9c) yielding essentially a cosine directivity pattern. The formula for the resonance of a right cylinder as expressed in the equation may be referred to as the mechanical resonance of the cylinder elements 31. The significance of the mechanical resonance of the transducer elements 31 is in the manner in which the resonant frequency relates to the electromechanical coupling coefficient of the piezo-electric elements per se. When placed in a sound field, the closer to the resonant frequency that the sound source is operated, the greater the mechanical to electrical transformation of energy is realized with attendant higher transducer efficiency. By practicing the invention, the applicants have observed that the instant transducer system sound pressure sensitivity is very high throughout the frequency range of from 5 cycles to 12 kilocycles, and that it is particularly efficient and sensitive in the frequency range from 6 kc to 12 kc. Moreover, the applicants have found that their system may be operated at frequencies substantially removed from the resonant frequency with a corresponding penalty in terms of electroacoustic efficiency, but not necessarily a corresponding change in the sound pressure-to-output voltage relationship or pressure sensitivity. Consequently, a useful voltage output may be achieved from transducer 10 at frequencies as low as 5 cycles without significant pattern degradation in either the omnidirectional or directional modes of operation.

Figure 9C:
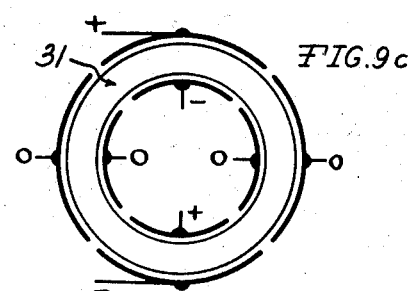
Figure 9D:
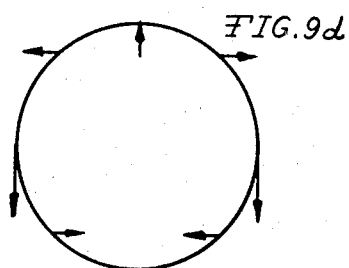

In a more detailed manner FIG. 9c and FIG. 9d represent the stress of a piezoelectric transducer cylinder 31 excited in the $n_1$ mode. As shown in FIG. 9d the upper half of the cylinder is stressed in one radial direction, while the lower half is stressed in the opposite radial direction. At points midway between these two halves the tangential stress is maximum while the radial component is zero. Because the element is sensitive only to radial stressing, a voltage will not be developed at the nodes, as illustrated by FIG. 9c. While absolute pressure activates the $n_0$ mode, the pressure gradient is the motivating influence of the $n_1$ mode. The pressure gradient of a sonic wave is 90 degrees out of phase with the absolute pressure of that wave. Therefore, the voltage developed in an individual element due to the $n_1$ mode is 90 degrees out of phase with the voltage developed by stresses of the $n_0$ mode.

The output of one element of the segmented cylinder is the sum of the $n_0$ and $n_1$ voltages. To separate the two voltages to obtain the signal developed in the $n_1$ mode, the outputs of the two opposite elements must be subtracted. The voltage produced in the $n_0$ mode in all elements is equal in amplitude and phase. Thus, there will be no difference and no output due to vibration in this particular mode.

The $n_1$ mode of vibration generates voltages in opposite elements that are equal in amplitude and 180 degrees out of phase. Therefore, the difference taken between opposite elements produces an output equal to the sum of the independent elements. If four equally-spaced electrodes are employed as illustrated in FIG. 4 it is possible to combine the voltage outputs as indicated to provide for two separate channels yielding sine/cosine patterns (spatially at right angles to each other). This is the response herein provided.

Applicants have found that by utilizing radial (through the cylinder wall thickness) polarization a significant increase in element capacity and sensitivity is realizable. These gains are provided by the use of thin wall ceramic cylinders, ordinarily impractical when using other forms of polarization. In other poling techniques, such as in tangential polarization, thin wall elements may not be readily employed as a practical matter because of the destructive effects resulting from the severe mechanical stresses incurred in the poling process. Inasmuch as 40,000 volts/cm. is typically used in polarizing ceramics, the relative large electrode spacing, and small dielectric cross sectional area introduces severe mechanical stresses in the material. However when poles through the cylinder wall thickness, damage is minimized while obtaining a more uniform potential gradient during the poling process. By utilizing thin wall cylinders, applicants realize high capacitance values with electrode spacing being wall thickness. In other methods of poling where large sections of the ceramic are involved the likelihood of obtaining ceramic chemical, mechanical and electrical uniformity throughout the entire volume involved is quite low and hence costs of manufacture are significantly greater due to poor yields.

The applicants have minimized the problem of transducer element nonuniformity and have thereby significantly reduced their manufactured cost. More significant is the element uniformity now possible between opposed element quadrant capacities and increased voltage sensitivity. It is imperative for high sensitivity and pattern symmetry that the opposing quadrants of the respective directional transducer elements be electrically substantially identical, and this has now been made possible by the instant invention. The ceramic polarization and electrode configuration enable a level of synergism in results not heretofore possible, particularly when taken in conjunction with the stabilized probe for underwater search operations.

The underwater transducer assembly of the instant invention is a composite unit consisting of cylindrical elements 31 which provide for omnidirectional and directional operations. As illustrated in FIG. 5, the elements 31 are positioned so that each directional transducer element (even numbered units) is disposed between an omnidirectional element, and separated therefrom by neoprene or another suitable acoustic isolator 33a. It has been found that mechanical rigidity and ease of manufacture can be enhanced by employing a plastic separator 33 in conjunction with the acoustic isolator 33a. The piezoelectric ceramic (as shown in FIG. 5) elements 1, 3, 5, 7, 9 and 11, are omnidirectional units which are employed for both transmission and reception. Interposed between these are segmented receiving (or alternately transmitting if desired) units consisting of functional sections as shown in FIG. 4, which have sine-cosine described directional responses. The sine described directional response for the X channel being substantially disposed in a horizontal plane and the cosine directional response for the Y channel being similarly disposed in the horizontal plane as shown by FIG. 10. Experimental results have verified that the patterns are not significantly effected by frequency of operation. When connected for operation in the omni mode, the system has been found to respond to within 1 db total variation throughout the angular range.

In FIG. 10 wherein is shown the signal flow and operations for the surface and subsurface sections of the search and tracking system it can be seen that the composite command and sonic signal conveyed by UHF transmission from the command transmitter enters the surface assembly and is duplexed to the UHF receiver. The command is sent to a decoder after demodulation by the receiver. The decoder inhibits all signals except the desired address tone combination. Under this condition the decoder allows the sonic signal to pass on to activate the T/R relays for the transmit condition. The signal which follows the address is required to hold the relays in the transmit condition. All the address signals, therefore, must be present in a given sequence to permit transmission of a sonar pulse.

Following the signal (FIG. 10) from the surface unit down the cable to the subsurface assembly, it passes through the T/R relay where it is amplified and applied to the omni sections of the transducer through another T/R relay. The water is ensonified by the sonar pulse (applied signal). When the sonic signal from the command transmitter drops out, the T/R relays revert to their receiving mode. The incoming signal is sensed in three different ways by the transducer. The output level and relative polarity of each of the three transducer sections are related in accordance with the direction from which the acoustic signal arrives. Since the incident pressure wave is in the same relative phase for all three sections, the output relationships then, are dependent on the transducer characteristics, as hereinabove noted. The acoustic receiving patterns are shown at the transducer in the lower portion of FIG. 10; one being omnidirectional and is labeled "+" as a convenience in showing relative phase at an instant when the received pressure is at a positive peak. The others are sine-cosine dipole patterns which have the characteristic of output level variation with bearing. As bearing varies, the output signal phase changes alternatively from in-phase "+" to phase opposition "—" as the output diminishes, passes through zero and increases again.

The omni output, having constant level and phase regardless of bearing, provides an amplitude and phase reference for comparing the amplitude and polarities of the two bearing-sensitive signals. Because the dipole responses are spatially orthogonal, the information inherent in the three signals is sufficient to deduce bearing. These three signals and compass information are the primary inputs. Compass and sonic information from the three channels are multiplexed for transmission up the cable, with the data being presented to a VHF transmitter and radiated.

A flux gate compass has been found particularly useful to provide the bearing reference to magnetic north. This operates on a magnetic core saturation principle and utilizes a common core with toroidal winding to achieve greater uniformity between reactors. It permits direct transmittal of the output signals obviating the need to translate the output frequencies to concerve multiplexing signal band width.

As hereinabove disclosed, a significant advance in the art has been provided inasmuch as applicants make possible integral transducer phasing and summing with direct (sine-cosine) target bearing-related voltage outputs. Typically, the output of the directional transducer can be represented by the following response patterns:

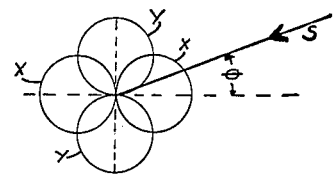

It is thus seen that the signal voltage output of the transducer with the response pattern represented by ($x$) is:

$$S_x = A \cos \theta$$

The output of the complementary pattern ($y$) is:

$$S_y = A \sin \theta$$

The coefficient "A" is indicative of the sound intensity level at the probe 1 location, and the value "A" of course assume the same value in both equations since the transducer sensitivity respecting both patterns is the same. This level of directional information simplicity is made possible by the inventive concept through the accuracy provided integrally within the transducer interstitial array and its synergistically related probe stabilization system. Uniquely cooperating with the probe 1 the fin and bridle assembly stabilization system make possible greater target bearing determinations not otherwise obtainable because of the surrounding dynamic fluid forces which would otherwise introduce errors. Compass information would suffer significantly as would the absolute accuracy of the directional beam patterns, particularly respecting amplitude.

Applicants not only provide for submerged body detection but also provide for securing meaningful directional target information under all sea states with a high degree of accuracy over the full 360° traverse, over a wide frequency range, and with good range. The basic inventive concept also makes possible high capacitance (inherently small dielectric spacing and large effective electrode areas) with ease of poling while minimizing cost. If desired, the instant system can also be employed strictly as a highly sensitive directional passive system with the dipole pattern ("X" and "Y" axes) and the reference voltage (omni) being provided by the array elements 31. For certain uses a direct cable link from the buoy to a vessel or aircraft may be desirably employed. Another alternative technique inherent in the instant concept is that which could lend itself to more economical signal processing for the purpose of establishing target bearing; namely, it may be desirable in the construction of the cylindrical array (FIG. 5) to progressively stagger (along a surface chord parallel with vertical probe axis) or skew the directional elements with reference to their respective horizontal maximum sensitivity coordinates such that each individual sine-cosine pair is oriented at a different azimuthal bearing angle, which will thereby enable each directional element of the array (interstitial with omni or array with all directional and modified interior electrode functionality) to be sequentially or continuously scanned for discrete target information.

It is thus apparent to those skilled in the art that various modifications of the invention can be made without departing from the concept hereof, and since various changes can be readily made as a matter of choice or desire, it is intended that all matter contained herein shall be interpreted as illustrative and not in a limiting sense.

What is claimed is:

1. An electromechanical transducer comprising, in combination,
   (a) support means,
   (b) at least two axially aligned annular piezoelectric elements on said support means and acoustically isolated therefrom, said elements being acoustically isolated each from another, said elements having major internal and external surfaces,
   (c) said surfaces having electrodes attached thereto,
   (d) the internally provided electrode being divided into two pair of insulated, equal and oppositely positioned electrode areas,
   (e) the externally provided electrode being divided into halves, one of said halves being further equally divided to provide external quadrature electrodes,
   (f) conducting means contiguous with said electrodes and making electrical connections thereto,
   (g) circuit means connecting internal diametrically opposed electrodes,
   (h) circuit means connecting said external surface half electrode to provide a common electrical voltage output,
   (i) circuit means connecting one of the provided external surface quarter electrodes to provide an "X" direction related voltage output, and
   (j) circuit means connecting the remaining external surface quarter electrode to provide an orthogonal related voltage output.

2. An acoustically sensitive transducer comprising, in combination,
   (a) support means,
   (b) at least one radially polarized cylindrical annular piezoelectric element mounted on said support means and acoustically isolated therefrom, and acoustically isolated from any adjacent piezoelectric elements, said element having major interior and exterior surfaces,
   (c) a plurality of inner electrodes attached to said annular element interior surface at opposed diametrical locations thereon, and a plurality of outer electrodes attached to said annular element exterior surface in radial and circumferential alignment with predetermined inner electrodes, said piezoelectric element providing dielectric spacing between said inner electrodes on the interior element surface and said outer electrodes on the exterior element surface, said electrodes covering a substantial portion of the major surfaces of said annular element, said electrodes being electrically insulated from immediately adjacent electrodes, and
   (d) conductors connecting diametrically opposed inner electrodes and electrical output means connected to said outer electrodes to provide a plurality of directional indicating output voltages.

3. An acoustically sensitive transducer comprising, in combination,
   (a) support means,
   (b) at least one radially polarized cylindrical annular piezoelectric element mounted on said support means and acoustically isolated therefrom, and acoustically isolated from any adjacent piezoelectric elements, said said element having major interior and exterior surfaces,
   (c) four inner electrodes attached to said annular element interior surface, each of said inner electrodes having circumferential lengths sufficient to cover approximately 90° of the said interior surface configuration, and a plurality of outer electrodes attached to said annular element exterior surface, said piezoelectric element providing dielectric spacing between said inner electrodes on the interior element surface and said outer electrodes on the exterior element surface, said electrodes covering a substantial portion of the major surfaces of said annular element, said electrodes being electrically insulated from immediately adjacent electrodes, and
   (d) electrical output means interconnecting said electrodes to provide a plurality of voltages.

References Cited
UNITED STATES PATENTS

| | | | |
|---|---|---|---|
| 2,795,709 | 6/1957 | Camp | 340—10UX |
| 3,176,262 | 3/1965 | Ehrlich et al. | 340—3 |
| 3,321,738 | 5/1967 | Trott | 340—10 |

RODNEY D. BENNETT, Primary Examiner

B. L. RIBANDO, Assistant Examiner

U.S. Cl. X.R.

340—2, 9